(12) United States Patent
Yin (10) Patent No.: US 12,501,908 B1
(45) Date of Patent: Dec. 23, 2025

(54) RESTRAINER

(71) Applicant: Bluewise INC, Dover, DE (US)

(72) Inventor: Aicheng Yin, Shenzhen (CN)

(73) Assignee: Bluewise INC

( * ) Notice: Subject to any disclaimer, the term of this patent is extended or adjusted under 35 U.S.C. 154(b) by 0 days.

(21) Appl. No.: 19/055,552

(22) Filed: Feb. 18, 2025

(30) Foreign Application Priority Data

Jan. 4, 2025 (CN) .......................... 202520014661.3

(51) Int. Cl.
*A22B 5/00* (2006.01)

(52) U.S. Cl.
CPC ..................... *A22B 5/00* (2013.01)

(58) Field of Classification Search
CPC ............. A22B 5/00; A22B 3/08; A22B 3/086
USPC .......................................................... 452/54
See application file for complete search history.

(56) References Cited

U.S. PATENT DOCUMENTS

| | | | | |
|---|---|---|---|---|
| 462,117 A | * | 10/1891 | Emerson | A22B 3/086 248/314 |
| 1,410,640 A | * | 3/1922 | Baker | A22B 3/086 452/54 |
| 2,518,231 A | * | 8/1950 | Fudge | A22B 3/086 452/54 |
| 2,640,224 A | * | 6/1953 | George | A22B 3/086 452/54 |
| 2,787,807 A | * | 4/1957 | Anderson | A22B 3/086 452/54 |
| 2010/0105305 A1 | * | 4/2010 | Pizzurro | A22B 3/00 452/52 |

\* cited by examiner

*Primary Examiner* — Richard T Price, Jr.
(74) *Attorney, Agent, or Firm* — JEEN IP LAW, LLC (57) ABSTRACT

A restrainer comprises at least two assembly parts which are detachably connected, wherein two or more assembly parts are connected to form a barrel structure provided with an upper opening and a lower opening, and a size of the upper opening is greater than a size of the lower opening. The restrainer is formed by the assembly parts which are detachably connected, such that poultry can be easily placed in the barrel structure in use and are unlikely to run away; space is saved when the restrainer is transported and stored.

9 Claims, 13 Drawing Sheets

RESTRAINER

CROSS-REFERENCE TO RELATED APPLICATIONS

This application claims priority to Chinese Patent Application No. 202520014661.3, filed on Jan. 4, 2025, which is hereby incorporated by reference in its entirety.

TECHNICAL FIELD

The disclosure relates to the technical field of poultry processing, in particular to a restrainer.

BACKGROUND

Poultry processing is common in daily life and includes slaughtering of a plenty of chickens, ducks and gooses in some processing plants. However, traditional slaughtering methods are extremely inconvenient, and manual pressing of poultry not only leads to low working efficiency, but also cannot guarantee the hygiene; the poultry will struggle recklessly in the processing process and are difficult to control, and blood from the poultry may splash onto operators.

SUMMARY

The disclosure provides a restrainer to solve the problems that poultry are difficult to control and working efficiency is low in the prior art.

The disclosure provides a restrainer, comprising at least two assembly parts which are detachably connected, wherein two or more assembly parts are connected to form a barrel structure provided with an upper opening and a lower opening, and a size of the upper opening is greater than a size of the lower opening.

Compared with the prior art, the restrainer provided by the disclosure has the following advantages: the barrel structure capable of receiving poultry is formed by at least two assembly parts that are detachably connected, and the size of the upper opening is greater than the size of the lower opening, such that the poultry can be easily placed in the barrel structure and are unlikely to struggle to run away, and the restrainer is easy to use, can effectively restrain the poultry and improves processing efficiency. In addition, the restrainer is easy to transport and store; when the restrainer is used, the assembly parts are connected; when the restrainer is transported or not used, the assembly parts can be dissembled to be stored separately, such that space is greatly saved.

BRIEF DESCRIPTION OF DRAWINGS

To better clarify the technical solutions in the embodiments of the disclosure, drawings used for describing the embodiments of the disclosure are briefly introduced below. Obviously, the drawings in the following description merely illustrate some embodiments of the disclosure, and those ordinarily skilled in the art can obtain other drawings according to the following ones without creative labor. Wherein.

DESCRIPTION OF EMBODIMENTS

The technical solutions in the embodiments of the disclosure will be clearly and completely described below in conjunction with accompanying drawings of these embodiments. Obviously, the embodiments described below are merely illustrative ones, and are not all possible ones of the disclosure. All other embodiments obtained by those ordinarily skilled in the art according to the following ones without creative labor should also fall within the protection scope of the disclosure.

It should be noted that all directional indicators (such as "upper", "lower", "left", "right", "front" and "back") in the embodiments of the disclosure are merely used to explain the relative positional relations and motions between components at a specific attitude, and once the specific attitude changes, these directional indications will change accordingly.

In addition, descriptions such as "first" and "second" involved in the disclosure are merely used for the purpose of description and should not be construed as indicating or implying relative importance or implicitly indicating the number of technical features referred to. Therefore, a feature defined by "first" or "second" may explicitly or implicitly indicate the inclusion of one said feature. In the description of the disclosure, "multiple" refers to at least two, such as two or three, unless otherwise expressly and specifically defined.

In the disclosure, unless otherwise expressly stated and defined, terms such as "connect" and "fix" should be broadly understood. For example, "connect" may refer to fixed connection, detachable connection or integrated connection; mechanical connection or electrical connection; direct connection, indirect connection by means of an intermediate medium, or internal connection or interaction of two elements. Those ordinarily skilled in the art can appreciate the specific meanings of these terms in the disclosure as the case may be.

In addition, the technical solutions in the embodiments of the disclosure may be combined as long as they can be implemented by those ordinarily skilled in the art. When a combination of the technical solutions causes a conflict or cannot be implemented, this combination should be construed as non-existent and should not fall within the protection scope of the disclosure.

Figure 1:
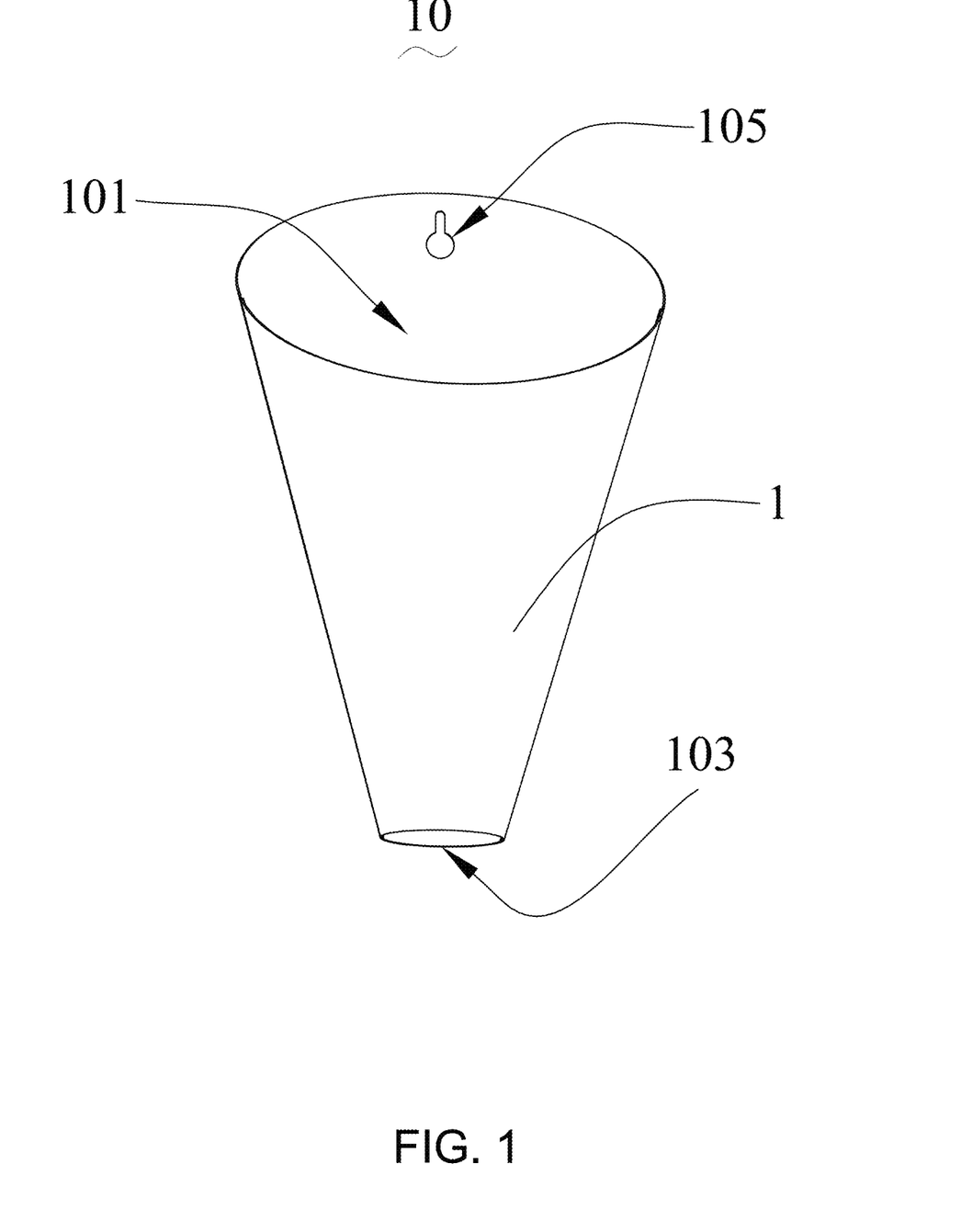
FIG. 1 is a schematic diagram of the stereo-structure of a restrainer according to Embodiment 1 of the disclosure.
Figure 2:
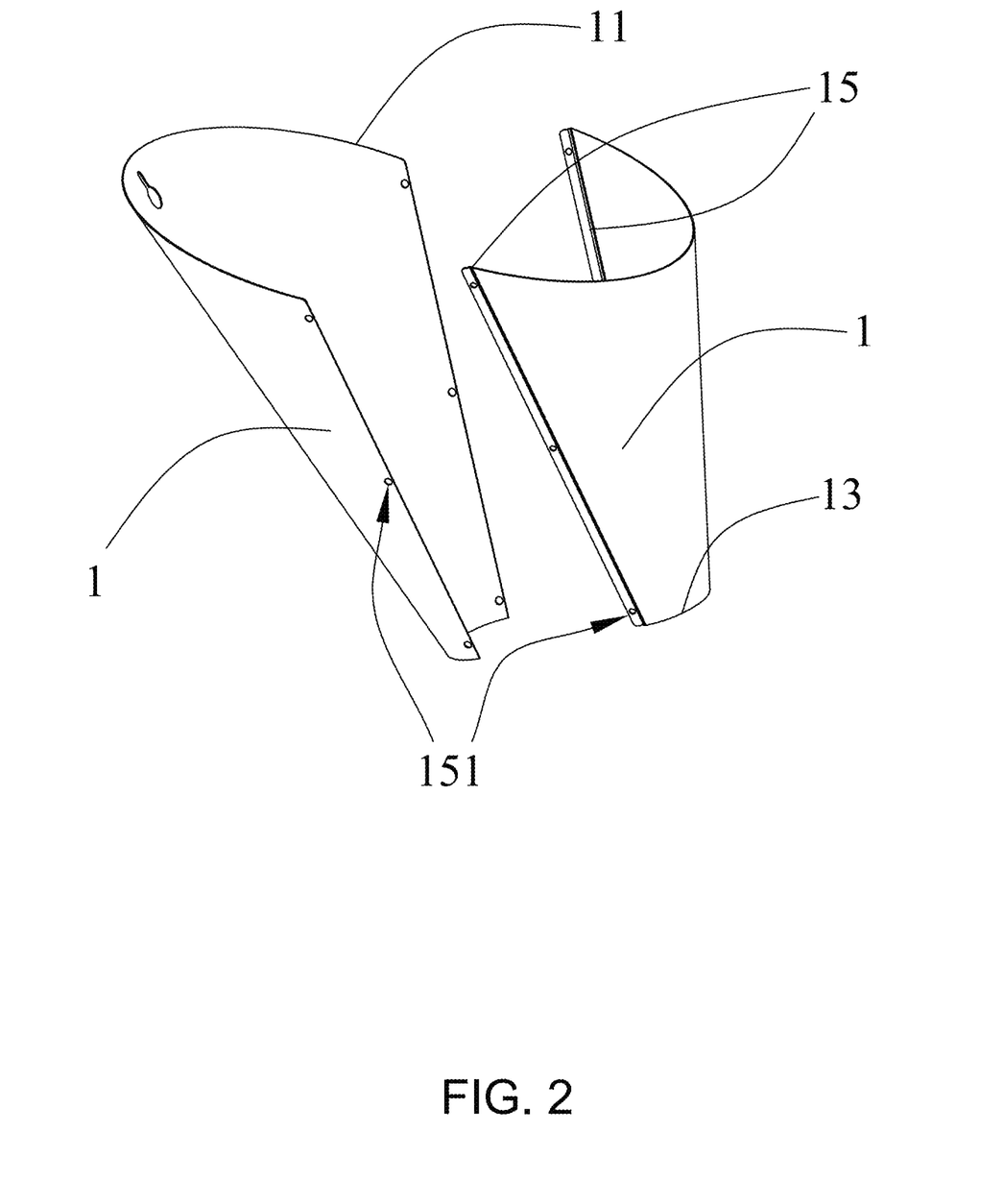
FIG. 2 is an exploded view of the stereo-structure of the restrainer according to Embodiment 1 of the disclosure.

Referring to FIGS. 1-2 which are respectively a schematic diagram of the stereo-structure of a restrainer 10 according to Embodiment 1 of the disclosure and an exploded view of the stereo-structure of the restrainer 10 according to Embodiment 1 of the disclosure, the restrainer 10 comprises at least two assembly parts 1 which are detachably connected, wherein two or more assembly parts 1 are connected to form a barrel structure provided with an upper opening 101 and a lower opening 103, and the size of the upper opening 101 is greater than that the size of the lower opening 103. The whole restrainer 10 is configured as an inverted cone-shaped barrel structure with two openings. When poultry need to be slaughtered, the poultry are placed in the restrainer upside down from the upper opening 101 and slide downward under the action of gravity, such that the head of the poultry stretches out of the lower opening 103, and the body of the poultry is restrained by the assembly parts 1 and cannot struggle to get free. Operators just need to process the head of the poultry by means of the lower opening 103, and operation is extremely easy; and the poultry are effectively restrained, and blood from the poultry will not splash onto the operators.

In addition, the restrainer 10 is easy to transport and store. When the restrainer 10 is used, the assembly parts 1 are connected. When the restrainer 10 is transported or not used, the assembly parts 1 may be disassembled to be stored separately, thus greatly saving space.

It should be noted here that the assembly part 1 may be configured as a curved structure, a planar structure or a polyhedral structure, and correspondingly, an upper edge 11 and a lower edge 13 of the assembly part 1 may be curved segments, straight segments or polyline segments. In addition, the assembly part 1 may be formed by multiple of the curved structure, the planar structure and the polyhedral structure. For example, an upper portion and a lower portion of the assembly part 1 may be configured as different structures, an upper half of the assembly part 1 is configured as the planar structure or the polyhedral structure, and a lower half of the assembly part 1 is configured as the curved structure. For another example, three assembly parts 1 configured as planar structures may be combined to form the restrainer 10 similar to a triangular pyramid structure, four assembly parts 1 configured as planar structures may be combined to form a barrel structure shaped like a square inverted cone, and five assembly parts 1 configured as planar structures are combined to form a barrel structure shaped like a pentagonal inverted cone. Details will not be provided here.

In Embodiment 1, the assembly parts 1 are configured as curved structures, the number of the assembly parts 1 is two, side edges of the two adjacent assembly parts 1 are connected, the upper opening 101 is defined by the upper edges 1 of the assembly parts 1, and the lower opening 103 is defined by the lower edges 13 of the assembly parts 1. The side edges of every two adjacent assembly parts 1 are connected, such that a space for receiving poultry is effectively formed, and materials of the assembly parts 1 can be used to the maximum extent to reduce the production cost.

Figure 3:
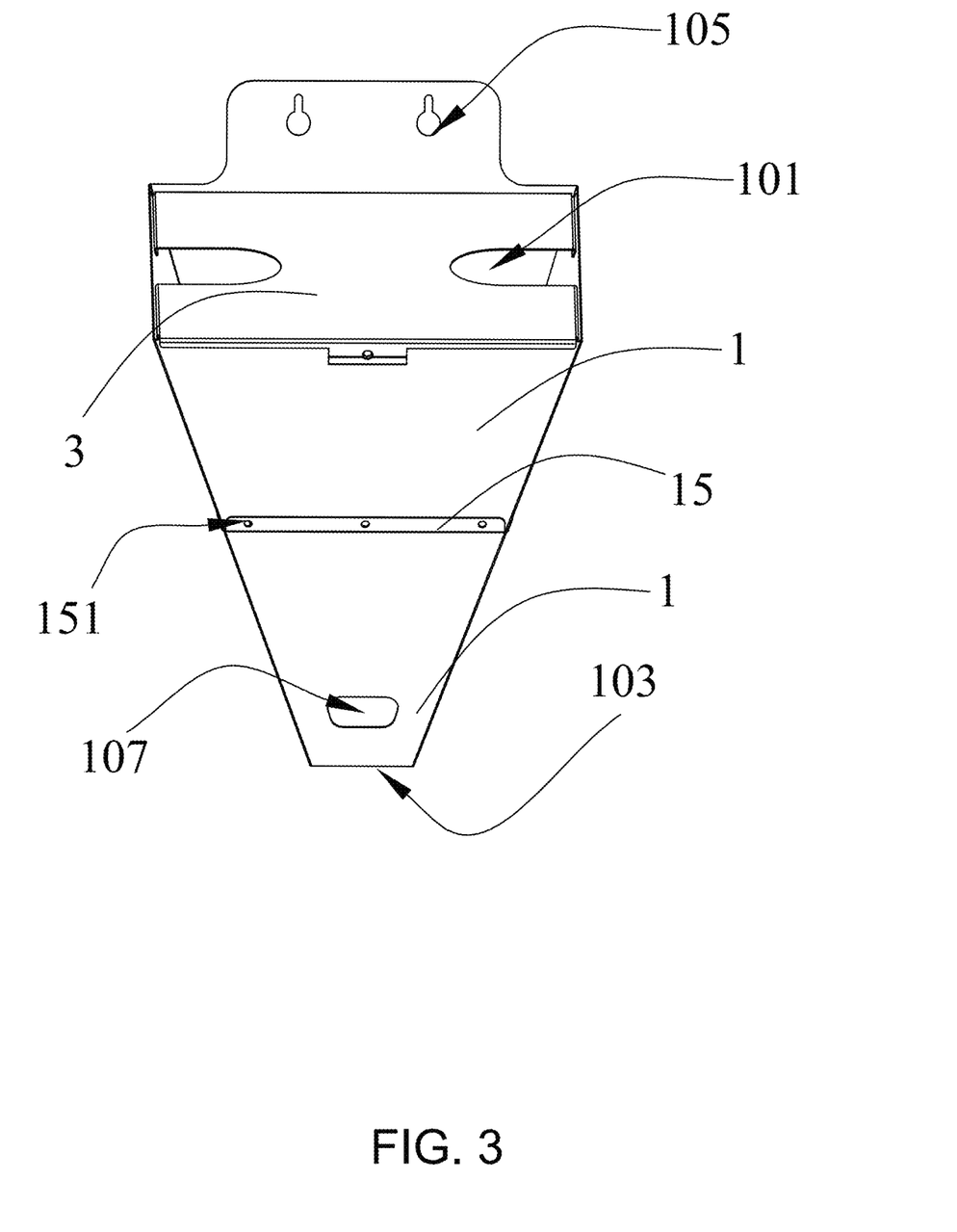
FIG. 3 is a schematic diagram of the stereo-structure of the restrainer according to Embodiment 2 of the disclosure.
Figure 4:
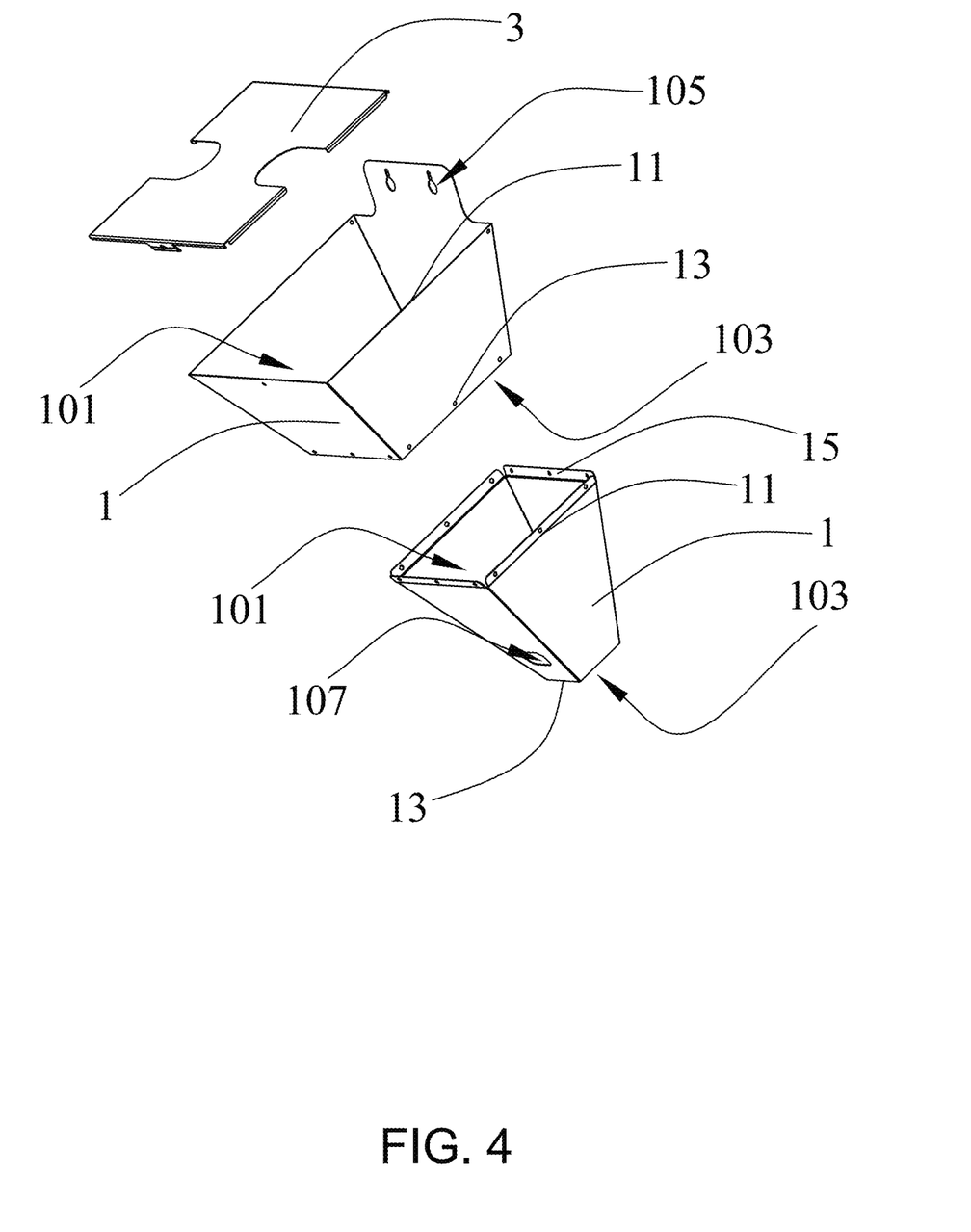
FIG. 4 is an exploded view of the stereo-structure of the restrainer according to Embodiment 2 of the disclosure.
Figure 5:
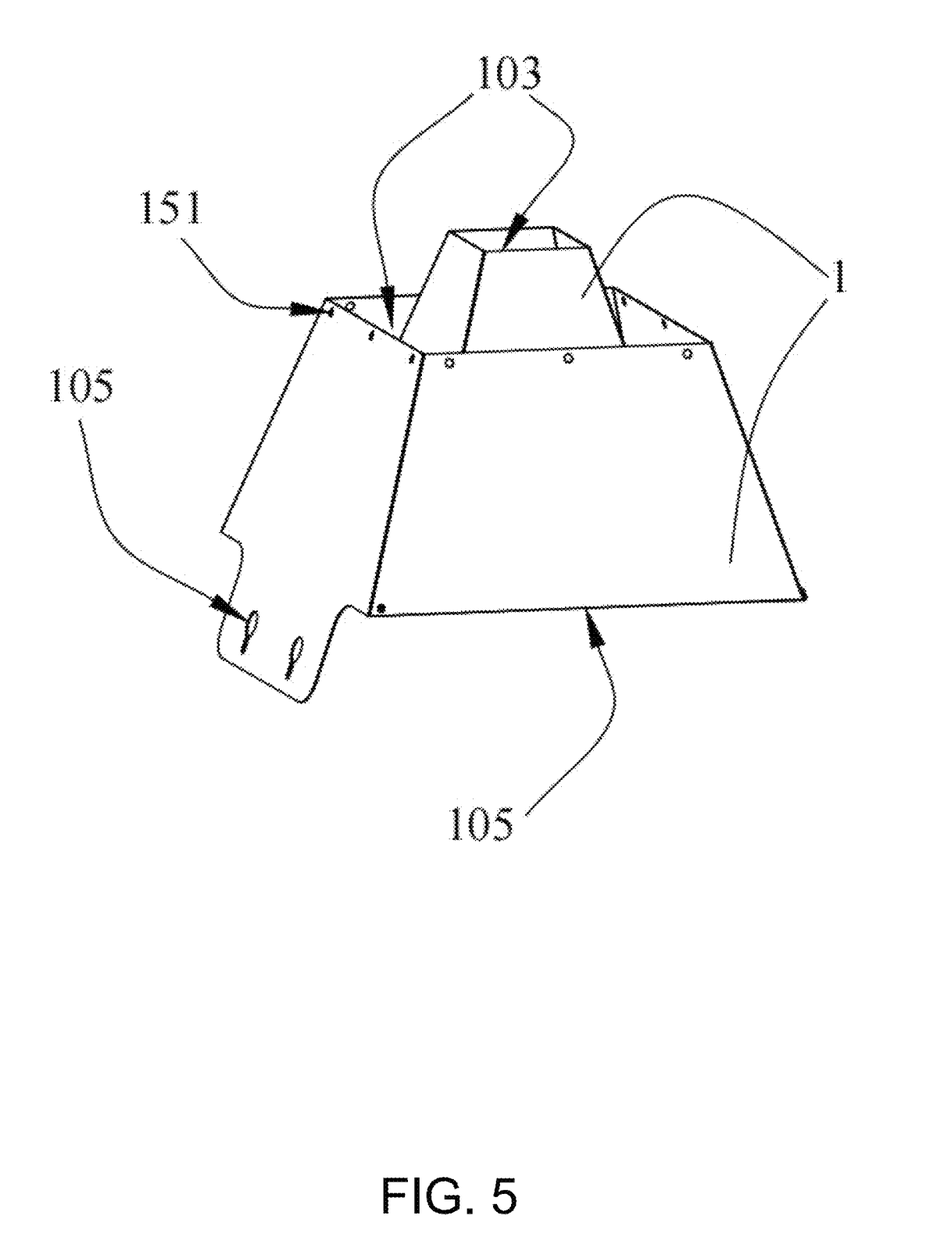
FIG. 5 is a schematic diagram of the restrainer in a state where the restrainer is disassembled and stored according to Embodiment 2 of the disclosure.

Referring to FIGS. 3, 4 and 5 which are respectively a schematic diagram of the stereo-structure of the restrainer 10 according to Embodiment 2 of the disclosure, an exploded view of the stereo-structure of the restrainer 10 according to Embodiment 2 of the disclosure and a schematic diagram of the restrainer 10 in a state where the restrainer 10 is disassembled and stored according to Embodiment 2 of the disclosure, in Embodiment 2, the assembly parts 1 are configured as polyhedral structures, and the number of the assembly parts 1 is two. Compared with Embodiment 1, the two adjacent assembly parts 1 in Embodiment 2 are connected vertically, each assembly part 1 is configured as a barrel structure with the upper opening 101 and the lower opening 103, and the size of the lower opening 103 of one assembly part 1 corresponds to the size of the upper opening 101 of the other adjacent assembly part 1. Of course, more than two assembly parts 1 may be arranged and are connected vertically to be assembled, and the sizes of the lower opening 103 and the upper opening 101 of every two adjacent assembly parts 1 are set correspondingly. When the in restrainer 10 in Embodiment 2 is stored or transported, the assembly parts 1 are assembled vertically to be received and stored in one another, that is, the smaller assembly part 1 located below is placed in the larger assembly part 1 located above to be stored in the larger assembly part 1, such that space is saved. As shown in FIG. 5, two assembly parts 1 have different sizes, the assembly part 1 with a small size is placed inside the assembly part 1 with a large size, the lower openings 103 of the two assembly parts 1 are in a same direction, and the upper openings 101 of the two assembly parts 1 are in a same direction, such that space is greatly saved.

Figure 6:
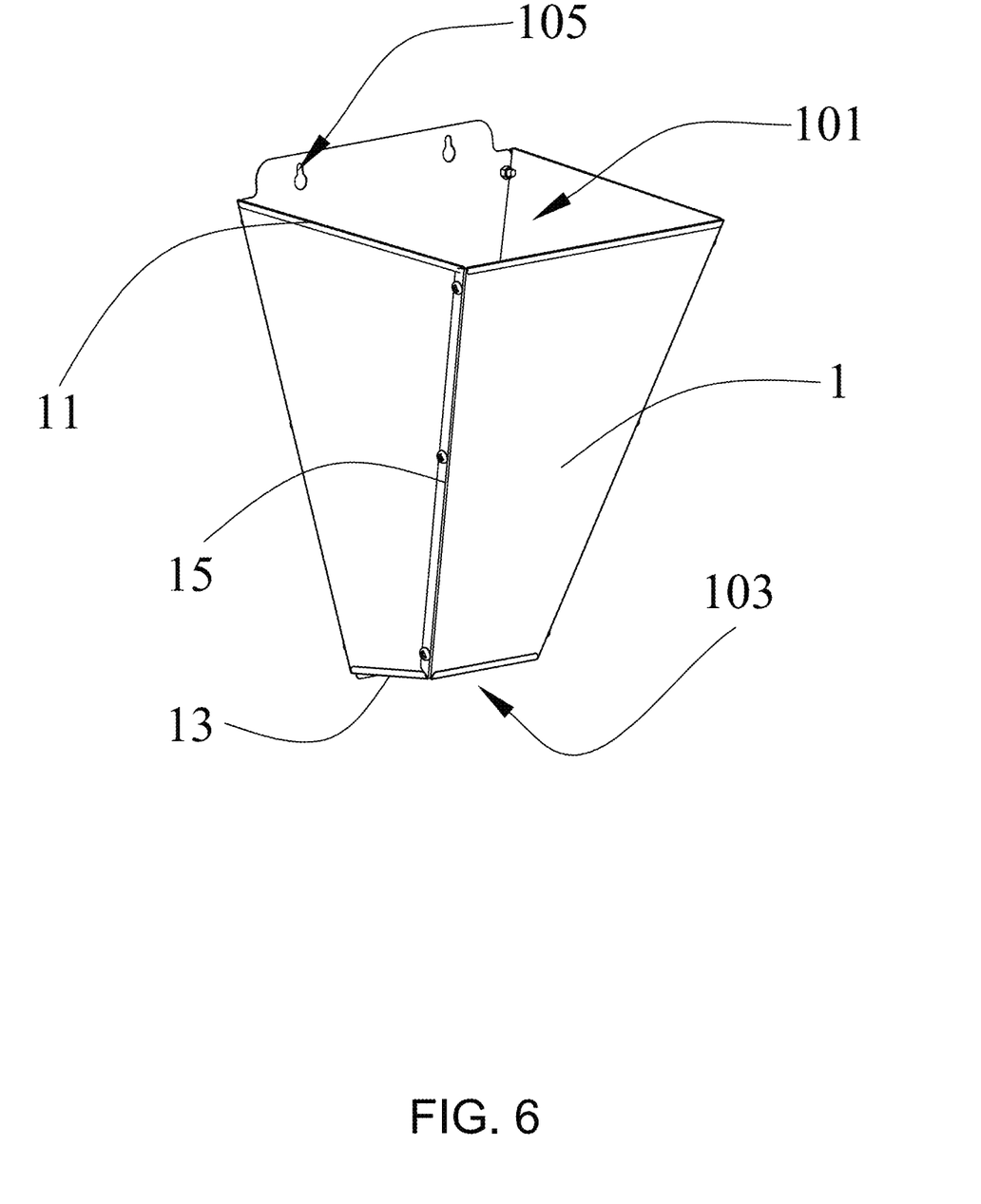
FIG. 6 is a schematic diagram of the stereo-structure of the restrainer according to Embodiment 3 of the disclosure.
Figure 7:
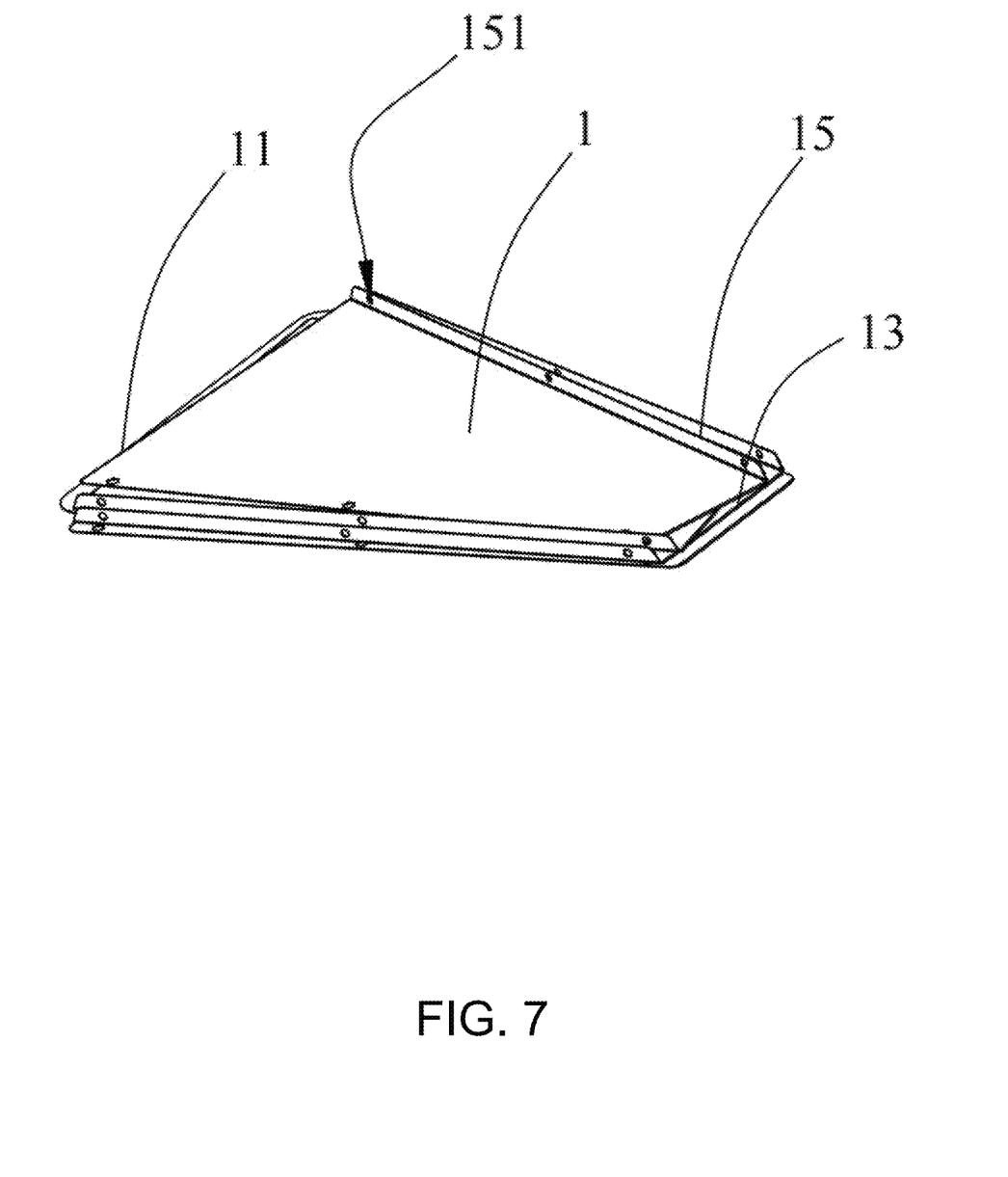
FIG. 7 is a schematic diagram of the restrainer in a state where the restrainer is disassembled and stored according to Embodiment 3 of the disclosure.

Further referring to FIGS. 6 and 7 which are respectively a schematic diagram of the stereo-structure of the restrainer 10 according to Embodiment 3 of the disclosure and a schematic diagram of the restrainer 10 in a state where the restrainer is disassembled and stored according to Embodiment 3 of the disclosure, in Embodiment 3, the assembly parts 1 are configured as planar structures, and the number of the assembly parts 1 is four. To ensure that poultry can smoothly enter the restrainer 10 and will not struggle out of the restrainer 10 easily, the sizes of the upper opening 101 and the lower opening 103 need to be set correspondingly. Therefore, the upper edge 11 of at least one assembly part 1 of the restrainer 10 is longer than the lower edge 13 of the assembly part 1. Of course, to further reduce the production cost, the upper edge 11 and the lower edge 13 of some assembly parts 1 are as long as each other. For example, two assembly parts 1 are configured as trapezoidal structures, and two square structures are arranged between the two assembly parts 1 configured as trapezoidal structures, such that the size of the upper opening 101 is greater than the size of the lower opening 103. In this way, the use of the restrainer 10 will not be affected, and the size of the assembly parts 1 can be reduced correspondingly, thus saving space and reducing the production cost.

Of course, the assembly parts 1 may be arranged symmetrically on the whole. For example, in Embodiment 3, structures of the assembly parts 1 are approximately the same, the assembly parts 1 are all configured as trapezoidal structures of the same size, the upper edges 11 of the assembly parts 1 are correspondingly as long as the lower edges 13 of the assembly parts 1, and the size of the upper opening 101 of the restrainer 10 formed by connecting the assembly parts 1 is greater than the size of the lower opening 103 of the restrainer 10. In this way, the production cost can be effectively reduced, identical assembly parts 1 are machined, and multiple assembly parts 1 matching each other in size do not need to be arranged separately.

In addition, as shown in FIG. 7, after being disassembled, the assembly parts 1 are planar blocky structures and can be directly stacked to be stored, such that space is saved, and transportation is easy.

Figure 8:
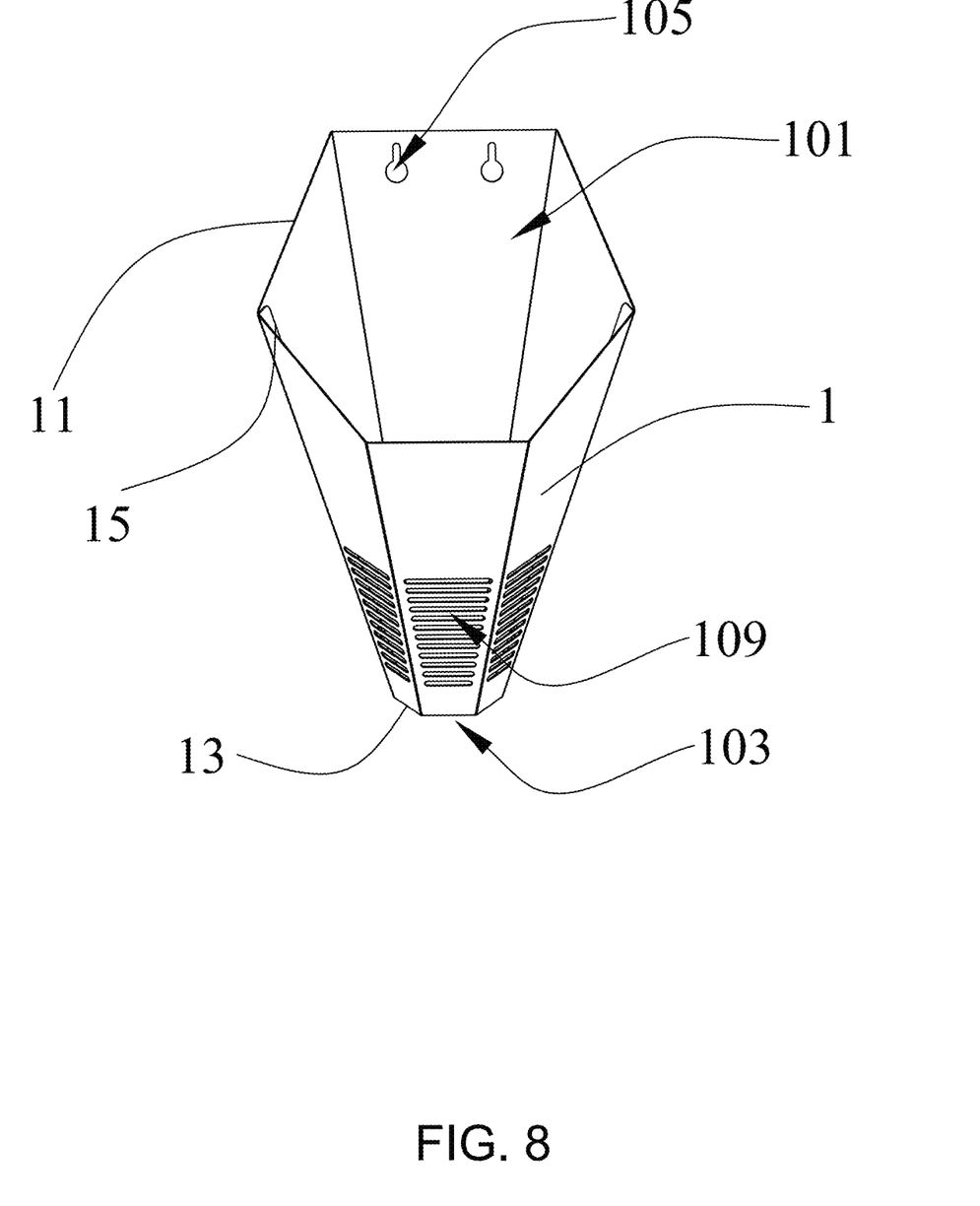
FIG. 8 is a schematic diagram of the stereo-structure of the restrainer according to Embodiment 4 of the disclosure.
Figure 9:
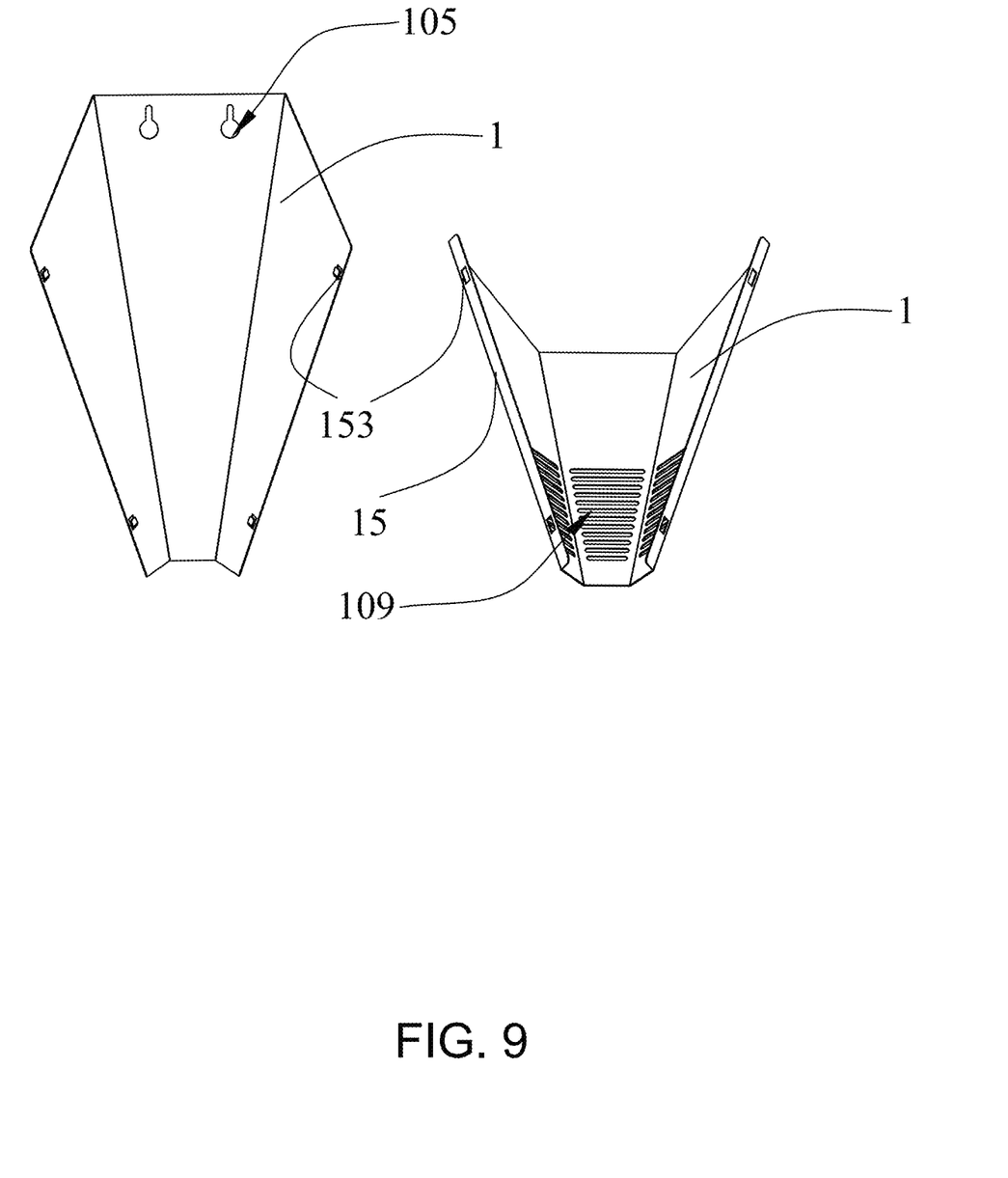
FIG. 9 is an exploded view of the stereo-structure of the restrainer according to Embodiment 4 of the disclosure.

Further referring to FIGS. 8 and 9 which are respectively a schematic diagram of the stereo-structure of the restrainer 10 according to Embodiment 4 of the disclosure and an exploded view of the stereo-structure of the restrainer 10 according to Embodiment 4 of the disclosure, in Embodiment 4, the assembly parts 1 are configured as polyhedral structures, and the number of the assembly parts 1 is two. Each assembly part 1 has three surfaces, and the two assembly parts 1 are connected to form a barrel structure with sixth surfaces. The sizes of the two assembly parts 1 may be set correspondingly, such that the assembly parts 1, after being disassembled, can be stacked to be stored. It can be known from the above embodiments that to effectively restrain poultry to facilitate slaughtering of the poultry, the assembly parts 1 may be configured as structures in various shapes; and the assembly parts 1 are detachably connected to facilitate assembly, storage and transportation.

Further referring to FIGS. 2, 4 and 9 which are respectively exploded views of the restrainer 10 in Embodiment 1, Embodiment 2 and Embodiment 4, to facilitate the connection between adjacent assembly parts 1, connecting segments 15 may be arranged on the side edges of the assembly parts 1, the upper edges 11 and/or the lower edges 13, connecting holes 151 or clamping structures 153 are arranged on the connecting segments 15, and adjacent assembly parts 1 may be correspondingly connected by means of the connecting segments 15.

In Embodiment 1, the connecting segments 15 are arranged on the side edges of the assembly parts 1, and the connecting holes 152 are formed in the connecting segments 15. In Embodiment 4, the connecting segments 15 are arranged on the side edges of the assembly parts 1, and the clamping structures 153 are arranged on the connecting segments 15. In Embodiment 2, the connecting segments 15 are arranged on the upper edges 11 and the lower edges 13 of the assembly parts 1, and the connecting holes 151 are formed in the connecting segments 15. It should be noted here that the connecting segments 15 may be arranged according to the specific number and structure of the assembly parts 1, and the connecting holes 151, or the clamping structures 153, or both the connecting holes 151 and the clamping structures 153 may be arranged to realize quick assembly and disassembly. The disclosure has no limitation in this aspect.

The connecting segments 15 not only may be arranged on edges of the assembly parts 1, but also may be arranged on the assembly parts 1. That is to say, the connecting segments 15 may not be arranged on the edges of all the assembly parts 1 and may be arranged correspondingly according to assembly requirements. In addition, the connecting segments 15 may be parts independent of the assembly parts 1, or holes may be directly formed in the assembly parts 1 to form the connecting segments 15. The disclosure has no further limitation in this aspect. Of course, threaded connection, riveted connection or snap fit may be adopted, and details will not be provided here.

Figure 10:
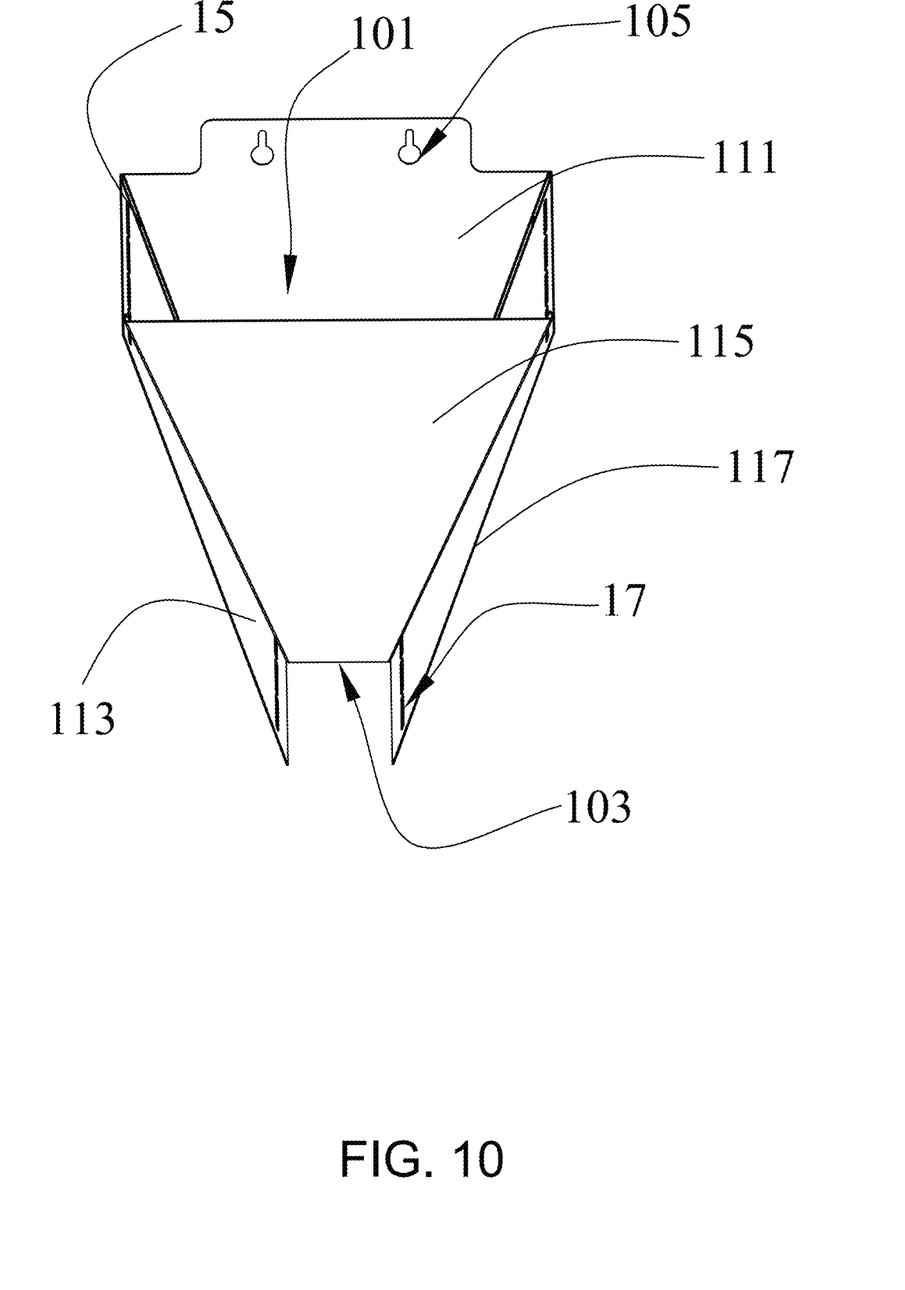
FIG. 10 is a schematic diagram of the stereo-structure of the restrainer according to Embodiment 5 of the disclosure.

Further referring to FIG. 10 which is a schematic diagram of the stereo-structure of the restrainer 10 according to Embodiment 1 of the disclosure, to make the size of the restrainer 10 adjustable to adapt to poultry of different sizes, for example, mating structures 17, corresponding to the connecting segments 15, are arranged on the assembly parts 1 to adjust connection positions of two adjacent assembly parts 1 so as to control the size of the upper opening 101 and/or the size of the lower opening 103. The connecting holes 151 or the clamping structures 153 arranged on the connecting segments 15 corresponding to the mating structures 17 may be mating holes, sliding grooves, clamping grooves or other structures, such that the mating structures 17 work together with the connecting segments 15 to realize size adjustment.

In Embodiment 5, the assembly part 1 is divided into a first portion 111, a second portion 113, a third portion 115 and a fourth portion 117, wherein the first portion 111 and the third portion 115 are configured as trapezoidal planar structures, and the upper edge 11 is longer than the lower edge 13. The second portion 113 and the fourth portion 117 are configured as square planar structures, multiple connecting holes 151 are formed in the second portion 113 and the fourth portion 117 to form the connecting segments 15, and by adjusting the installation positions of the connecting segments 15, the restrainer 10 can be adjusted by means of the first portion 111 and the third portion 115 to control the size of the upper opening 101 and the size of the lower opening 103.

Figure 11:
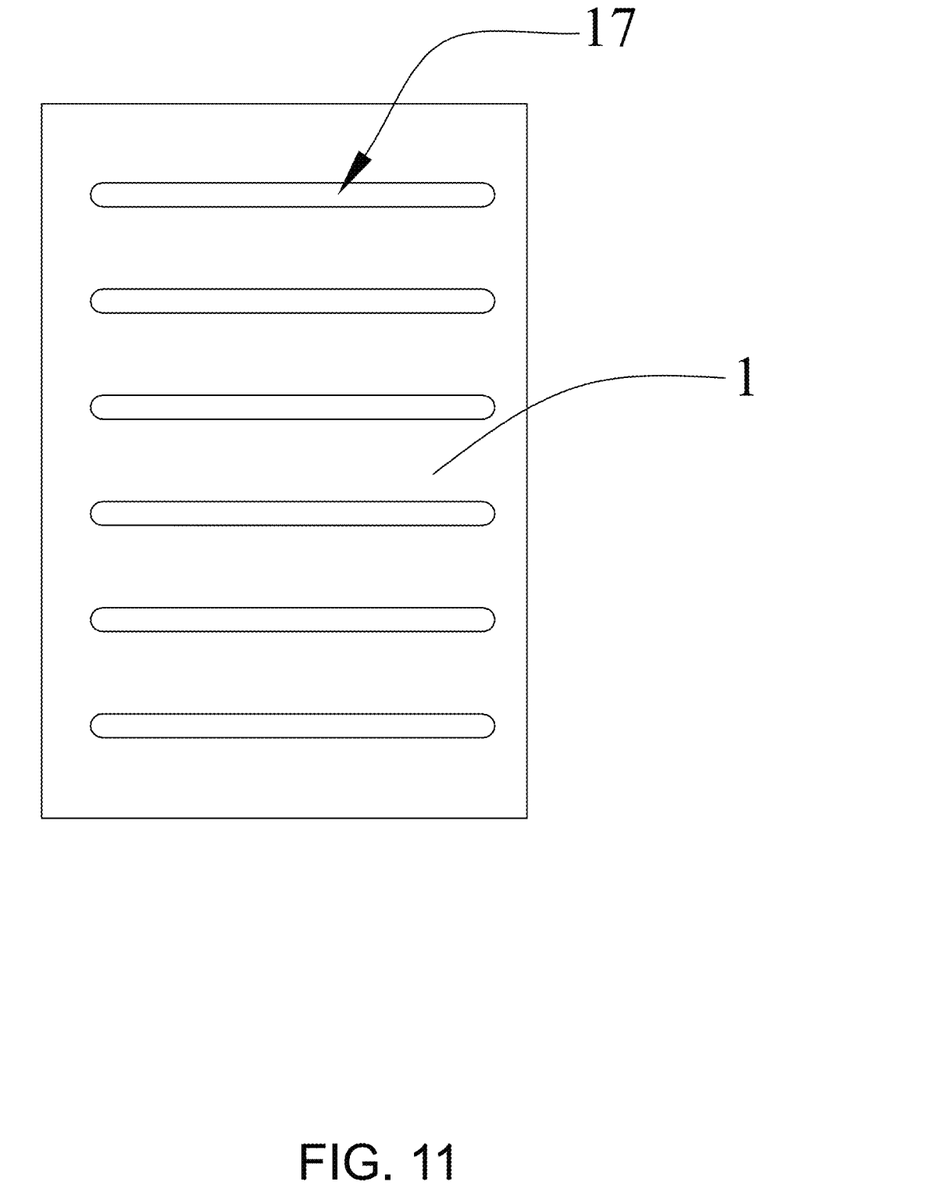
FIG. 11 illustrates one embodiment of an assembly part shown in FIG. 10.
Figure 12:
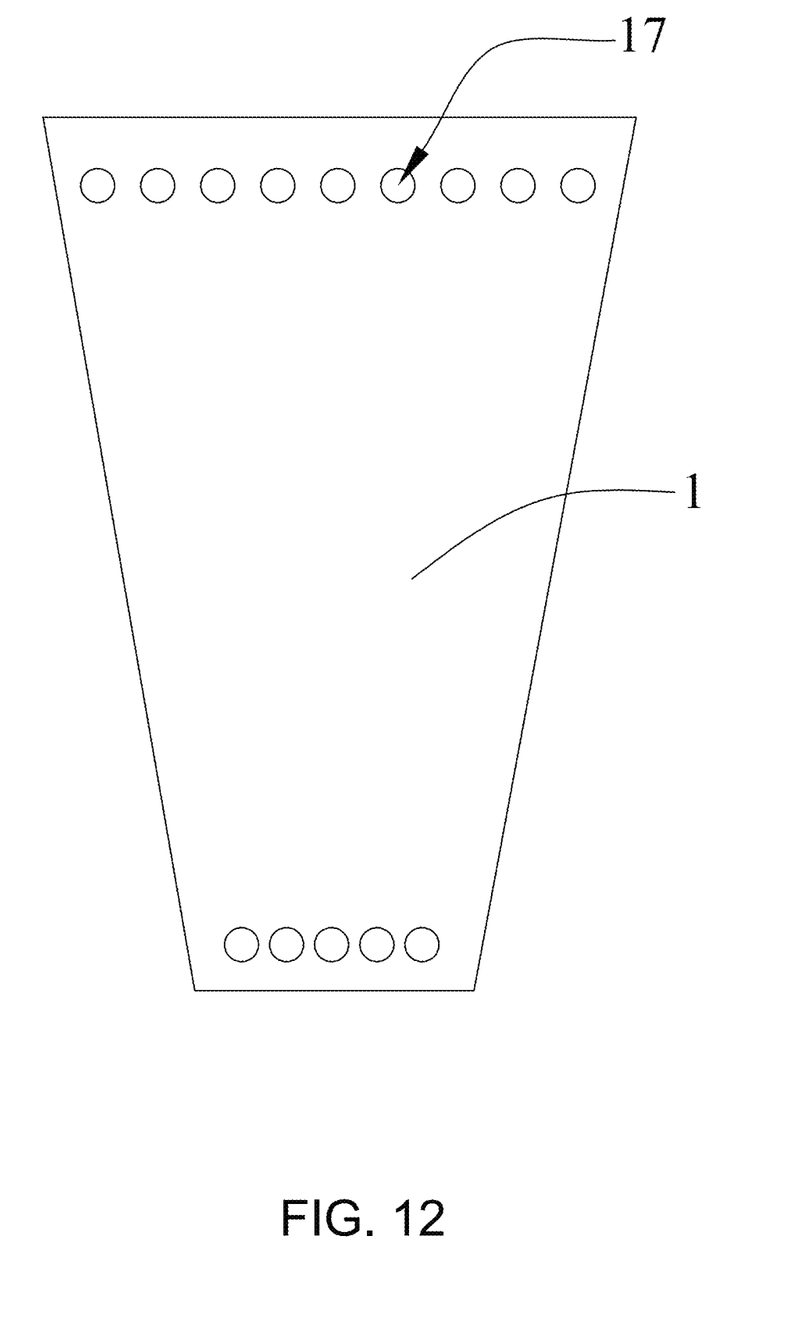
FIG. 12 illustrates another embodiment of the assembly part shown in FIG. 10.
Figure 13:
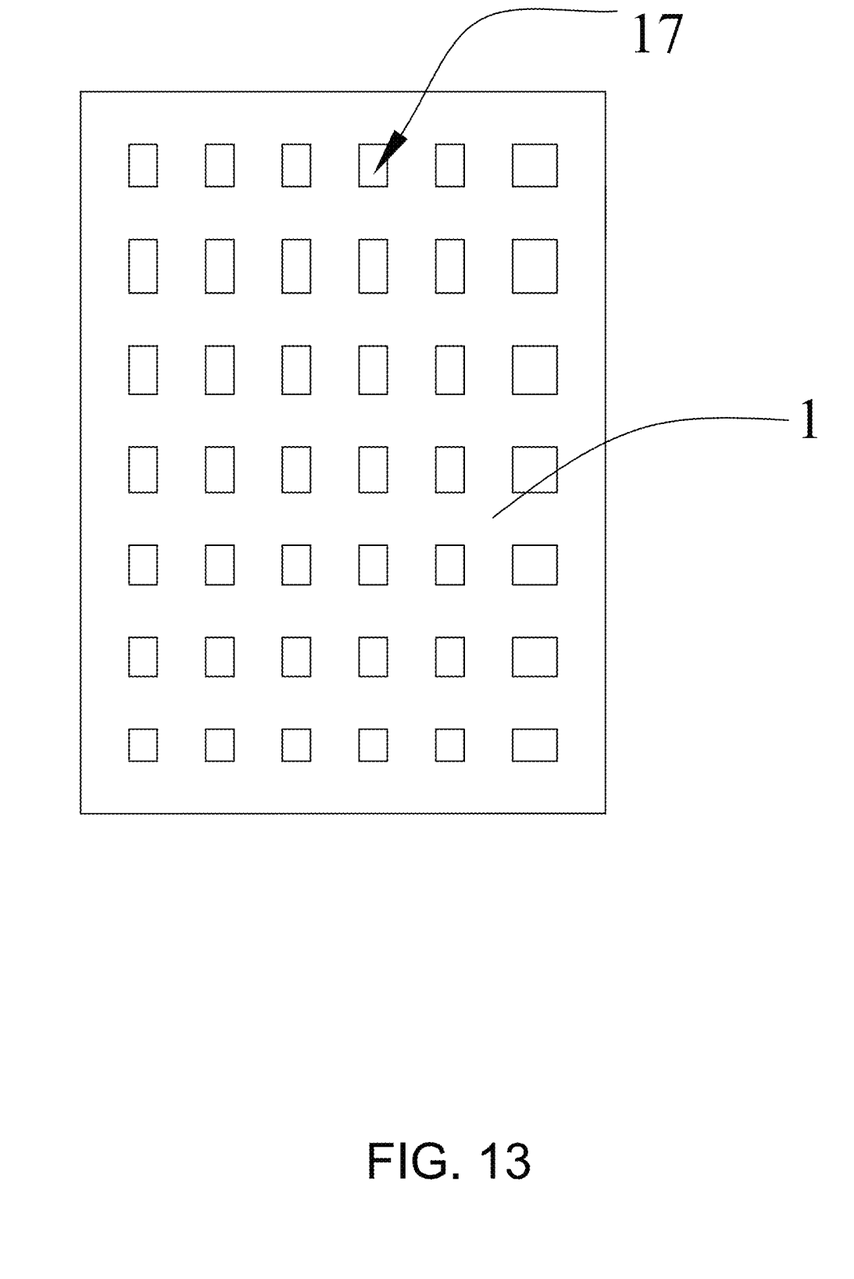
FIG. 13 illustrates another embodiment of the assembly part shown in FIG. 10.

Referring to FIGS. 11, 12 and 13, there may be multiple schemes for the mating structures 17 arranged on the assembly parts 1. For example, the mating structures 17 arranged on the second portion 113 and the fourth portion 117 in Embodiment 5 may be configured as multiple sliding grooves to realize sliding adjustment, such that operation is easier. Or, the mating structures 17 may be configured as multiple mating holes.

The assembly parts 1 may be configured as hollowed-out structures, such that materials can be effectively saved, poultry can be restrained, the internal condition can be observed, and ventilation and cleaning are facilitated. In addition, the hollowed-out structures may be overlapped with the mating structures 17, positions for mounting the mating structures 17 are reserved when the hollowed-out structures are arranged, such that the assembly parts 1 can be adjusted flexibly. Of course, the number of the connecting holes 151 or the sliding grooves is not limited here, this scheme may be applied to the above embodiments, and corresponding configurations may be adopted according to different structures of the assembly parts 1.

Further referring to FIGS. 3 and 4, a window 107 is arranged close to the lower edges 13 of the assembly parts 1, and operators can stretch the head of poultry out of the lower opening 103 by means of the window 107. To further restrain poultry from moving, the restrainer 10 further comprises a cover 3, wherein the cover 3 is movably arranged on sides, close to the upper edges 11, of the assembly parts 1, and the size of the cover 3 corresponds to the size of the upper opening 101. When poultry need to be placed in the restrainer 10, the cover 3 is opened; after the poultry are placed in the restrainer 10, the cover 3 is closed to prevent the poultry from moving upwards and downwards. Of course, the cover 3 may be connected to the assembly parts 1 by hinges to be controlled to be opened or closed, or the cover 3 may be clamped on the assembly parts 1 to be controlled to be opened or closed, and the disclosure has no limitation in this aspect. In addition, the cover 3 may be detachably connected to the assembly parts 1, such that when the restrainer 10 is transported or stored, the cover 3 can be detached to save space. Of course, the cover 3 may be arranged in the above embodiments, and details will not be provided here.

A suspension hole 105 is formed in at least one assembly part 1 of the restrainer 10 to realize hanging and installation of the restrainer 10. Operators may arrange a nail or support pillar for suspending the restrainer 10 on a tree or on a frame arranged in advance, and the restrainer 10 may be flexibly installed on the tree or the frame by means of the suspension hole 105. The suspension hole 105 is formed in one assembly part 1 and will not occupy extra space, and the restrainer can be hung easily.

Compared with the prior art, the restrainer 10 provided by the disclosure has the following advantages: the barrel structure capable of receiving poultry is formed by at least two assembly parts 1 that are detachably connected, and the size of the upper opening 101 is greater than the size of the lower opening 103, such that the poultry can be easily placed in the barrel structure and are unlikely to struggle to run away, and the restrainer 10 is easy to use, can effectively restrain the poultry and improves processing efficiency. In addition, the restrainer 10 is easy to transport and store; when the restrainer 10 is used, the assembly parts 1 are connected; when the restrainer 10 is transported or not used, the assembly parts 1 can be dissembled to be stored separately, such that space is greatly saved.

In addition, the connecting segments 15 and the mating structures 17 corresponding to the connecting segments 15 are arranged on the assembly parts 1, such that the restrainer 10 can be flexibly adjusted to be used for processing poultry of different sizes, thus expanding the application range of the restrainer 10. The cover 3 may be arranged to further restrain the poultry from moving; the suspension hole 105 is formed in at least one assembly part 1, such that the restrainer 10 can be mounted flexibly; the assembly parts 1 may be configured as hollowed-out structures and overlapped with the mating structures 17, such that the size can be adjusted flexibly, the material cost is reduced, the ventilation effect of the restrainer 10 is improved, and assembly, disassembly and cleaning are facilitated.

The embodiments of the disclosure are described above. It should be noted here that those ordinarily skilled in the art can make some improvements without deviating from the concept of the disclosure, and all these improvements should also fall within the protection scope of the disclosure.

What is claimed is:

1. A restrainer, being used for slaughtering poultry and comprising at least two assembly parts which are detachably connected, wherein two or more said assembly parts are connected to form a barrel structure provided with an upper opening and a lower opening, and a size of the upper opening is greater than a size of the lower opening;

wherein the assembly parts are configured as planar structures, and the number of the assembly parts is four, the assembly parts are arranged symmetrically on the whole, the assembly parts are all configured as trapezoidal structures of the same size, four assembly parts are combined to form a barrel structure shaped like a square inverted cone;

wherein side edges of two adjacent said assembly parts are connected, the upper opening is defined by upper edges of the assembly parts, and the lower opening is defined by lower edges of the assembly parts; wherein connecting segments are arranged on the side edges of the assembly parts, and clamping structures are arranged on the connecting segments;

further comprising a cover, wherein the cover is movably arranged on sides, close to the upper edges, of the assembly parts, and a size of the cover corresponds to the size of the upper opening, the cover is detachably connected to the assembly parts.

2. The restrainer according to claim 1, wherein the upper edge of at least one said assembly part is longer than the lower edge of said assembly part.

3. The restrainer according to claim 1, wherein connecting segments are arranged on the side edges of the assembly parts and/or on the upper edges and the lower edges, and connecting holes or clamping structures are arranged on the connecting segments.

4. The restrainer according to claim 3, wherein mating structures corresponding to the connecting segments are arranged on the assembly parts and used for adjusting connection positions of two adjacent said assembly parts to control the size of the upper opening and/or the size of the lower opening.

5. The restrainer according to claim 4, wherein the mating structures are configured as mating holes, sliding grooves or clamping grooves.

6. The restrainer according to claim 1, wherein a suspension hole is formed in at least one said assembly part.

7. The restrainer according to claim 1, wherein a window is arranged close to lower edges of the assembly parts.

8. The restrainer according to claim 1, wherein two adjacent said assembly parts are vertically connected, and each said assembly part is configured as the barrel structure with the upper opening and the lower opening, and the sizes of the lower opening and the upper opening of the adjacent assembly parts are set correspondingly.

9. The restrainer according to claim 1, wherein the assembly parts are configured as hollowed-out structures.

\* \* \* \* \*